United States Patent
Kim et al.

(10) Patent No.: US 12,381,213 B2
(45) Date of Patent: Aug. 5, 2025

(54) POSITIVE ELECTRODE ACTIVE MATERIAL BY SOLID PHASE SYNTHESIS AND METHOD FOR MANUFACTURING THE SAME

(71) Applicant: LG Chem, Ltd., Seoul (KR)

(72) Inventors: Dae-Sung Kim, Daejeon (KR); Ho-Young Kwak, Daejeon (KR); Jun-Gyu Kim, Daejeon (KR); Jae-Young Moon, Daejeon (KR); Myoung-Hwan Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 512 days.

(21) Appl. No.: 17/920,836

(22) PCT Filed: Sep. 23, 2021

(86) PCT No.: PCT/KR2021/012987
§ 371 (c)(1),
(2) Date: Oct. 24, 2022

(87) PCT Pub. No.: WO2022/060207
PCT Pub. Date: Mar. 24, 2022

(65) Prior Publication Data
US 2023/0261184 A1 Aug. 17, 2023

(30) Foreign Application Priority Data
Sep. 21, 2020 (KR) .................. 10-2020-0121770

(51) Int. Cl.
*H01M 4/505* (2010.01)
*B02C 17/10* (2006.01)
(Continued)

(52) U.S. Cl.
CPC ............ *H01M 4/505* (2013.01); *C01G 53/44* (2013.01); *H01M 4/525* (2013.01);
(Continued)

(58) Field of Classification Search
CPC ....... B02C 17/10; B02C 17/16; B02C 17/163; H01M 4/505; H01M 4/525
See application file for complete search history.

(56) References Cited

U.S. PATENT DOCUMENTS

2008/0197218 A1  8/2008  Ishigaki et al.
2014/0329147 A1  11/2014  Mitsumoto et al.
(Continued)

FOREIGN PATENT DOCUMENTS

CN   101249466 A   8/2008
CN   106663793 A   5/2017
(Continued)

OTHER PUBLICATIONS

Extended European Search Report for Application No. 21869829.8 dated Nov. 17, 2023. 8 pgs.
(Continued)

*Primary Examiner* — Kevin E Yoon
(74) *Attorney, Agent, or Firm* — Lerner David LLP (57) ABSTRACT

A positive electrode active material and a method for manufacturing the same are disclosed herein. In some embodiments, a method includes mixing and grinding raw material particles to obtain ground product particles, where the raw material particles are source materials for a lithium composite transition metal oxide, sintering the ground product particles to synthesize the lithium composite transition metal oxide, and disaggregating and classifying the synthesized lithium composite transition metal oxide to obtain a positive electrode active material powder, wherein the mixing and grinding the raw materials includes placing the raw materials and beads in a chamber of a grinding device, where the grinding device includes a rotatable rotor in the chamber, and performing a dry process of mixing and grinding the raw material particles in the chamber by
(Continued)

rotating the rotor to give kinetic energy to the beads, causing collisions between the beads and the raw material particles.

8 Claims, 9 Drawing Sheets

(51) Int. Cl.
  *C01G 53/44* (2025.01)
  *H01M 4/525* (2010.01)
  *H01M 4/02* (2006.01)
(52) U.S. Cl.
  CPC ...... *C01P 2002/50* (2013.01); *C01P 2004/03* (2013.01); *C01P 2004/50* (2013.01); *C01P 2004/52* (2013.01); *C01P 2004/61* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2014/0367504 | A1 | 12/2014 | Ishikawa et al. |
| 2015/0004489 | A1 | 1/2015 | Song et al. |
| 2015/0093580 | A1 | 4/2015 | Kobayashi et al. |
| 2016/0301069 | A1 | 10/2016 | Kwak et al. |
| 2017/0288222 | A1* | 10/2017 | Kobayashi ............ C01G 53/40 |
| 2018/0264478 | A1 | 9/2018 | Son et al. |
| 2018/0342762 | A1* | 11/2018 | Arise ................. H01M 50/451 |
| 2020/0194788 | A1 | 6/2020 | Mitsumoto et al. |
| 2021/0013508 | A1 | 1/2021 | Kuroda |
| 2021/0083286 | A1 | 3/2021 | Kuroda et al. |
| 2021/0159496 | A1 | 5/2021 | Mitsumoto et al. |
| 2021/0408537 | A1 | 12/2021 | Hwang et al. |
| 2022/0029158 | A1 | 1/2022 | Takamori |

FOREIGN PATENT DOCUMENTS

| | | | |
|---|---|---|---|
| JP | H0554886 | A | 3/1993 |
| JP | 2004-303710 | A | 10/2004 |
| JP | 5921172 | B2 | 5/2016 |
| JP | 6293471 | B2 | 3/2018 |
| JP | 2018125305 | A | 8/2018 |
| JP | 6407754 | B2 | 10/2018 |
| JP | 6493408 | B2 | 4/2019 |
| JP | 2019-160571 | A | 9/2019 |
| JP | 2019-160573 | A | 9/2019 |
| JP | 6655289 | B2 | 2/2020 |
| JP | 2020-087879 | A | 6/2020 |
| KR | 20110044936 | A | 5/2011 |
| KR | 20130088669 | A | 8/2013 |
| KR | 20160111213 | A | 9/2016 |
| KR | 20170110374 | A | 10/2017 |
| KR | 20180113828 | A | 10/2018 |
| KR | 1020190057259 | A * | 5/2019 ............. C01B 33/32 |
| WO | 2013/077441 | A1 | 5/2013 |
| WO | 2014061580 | A1 | 4/2014 |
| WO | 2019/044733 | A1 | 3/2019 |
| WO | 2019/044734 | A1 | 3/2019 |
| WO | 2020106024 | A1 | 5/2020 |

OTHER PUBLICATIONS

Search Report dated Aug. 10, 2023 from Office Action for Chinese Application No. 202180032553.3 issued Aug. 14, 2023. 2 pages. (see p. 1, categorizing the cited references).
International Search Report for PCT/KR2021/01298 mailed Dec. 27, 2021. 3 pgs.
Search Report dated May 6, 2024 from Office Action for Chinese Application No. 202180032553.3 issued May 8, 2024. 2 pages.

\* cited by examiner

POSITIVE ELECTRODE ACTIVE MATERIAL BY SOLID PHASE SYNTHESIS AND METHOD FOR MANUFACTURING THE SAME

CROSS-REFERENCE TO RELATED APPLICATIONS

The present application is a national phase entry under 35 U.S.C. § 371 of International Application No. PCT/KR2021/012987, filed on Sep. 23, 2021, which claims priority to Korean Patent Application No. 10-2020-0121770 filed on Sep. 21, 2020, in the Republic of Korea, the disclosures of which are incorporated by reference herein.

TECHNICAL FIELD

The present disclosure relates to a positive electrode active material for a lithium secondary battery and a method for manufacturing the same. More particularly, the present disclosure relates to a NCM based lithium composite transition metal oxide (hereinafter, NCM) positive electrode active material with partial substitution of manganese and cobalt for nickel in lithium nickel oxide ($LiNiO_2$) and a method for manufacturing the same.

BACKGROUND ART

Lithium secondary batteries that can be repeatedly recharged are gaining much attention as an alternative to fossil energy. The lithium secondary batteries have been chiefly used traditional hand-held devices such as mobile phones, video cameras and electric tools. Recently, their range of applications is gradually expanding to the industrial field such as electric vehicles (EVs, HEVs, PHEVs), high capacity energy storage systems (ESSs) and uninterruptible power supplies (UPS).

A lithium secondary battery includes an electrode assembly including unit cells, each including a positive electrode plate and a negative electrode plate, each including a current collector coated with an active material, with a separator interposed between the positive electrode plate and the negative electrode plate, and a packaging or a battery case in which the electrode assembly is received together with an electrolyte solution in an airtight manner. The positive electrode active material of the lithium secondary battery includes lithium composite transition metal oxides, and among them, lithium cobalt oxide ($LiCoO_2$), lithium manganese oxide ($LiMnO_2$ or $LiMn_2O_4$), a lithium iron phosphate compound ($LiFePO_4$) or $LiNiO_2$ is chiefly used. Additionally, to increase low thermal stability of $LiNiO_2$ while maintaining its high reversible capacity, nickel manganese-based lithium composite metal oxide with partial substitution of manganese having high thermal stability for nickel and manganese cobalt substituted NCM are being used. The known synthesis methods of the positive electrode active material include a coprecipitation method, a sol-gel method, a solid phase synthesis method, a thermal spraying method and a combustion method.

The coprecipitation method is the most widely used, and involves simultaneous precipitation of composite metal components in a solution within a reactor. This process forms a precipitate of which the pH is controlled using a coprecipitating agent, for example, $NH_4OH$, depending on the characteristics of the raw material metals used, and causes collision between particles by the rotational force in the reactor and the structure produces to produce a secondary spherical powder in agglomerated form. However, when the amount of the coprecipitating agent and the reaction environment is not appropriately controlled, nonuniform coprecipitation makes a powder in the form of a mixture, not a compound, and such powder is not suitable for a positive electrode active material, and thus mass production is impossible. Additionally, the coprecipitation method requires high process costs due to the complicated process and poses an environmental issue such as wastewater.

In contrast, the solid phase synthesis method is a method for producing powder by a calcination process of vaporizing inorganic matter included in raw material powder obtained by mechanical mixing the raw material powder in solid state, and a sintering process of forming an oxide of uniform composition. In this method, uniformity and homogeneity of the raw material powder and its particle size greatly affect the sintering characteristics and the electrical properties, so it is important to control the step of producing raw material powder. The solid phase synthesis method achieves mass production by a relatively simple synthesis process, and is particularly appropriate for producing nickel-rich NCM having high nickel content. However, since the solid phase synthesis method mechanically mixes the raw material powder in solid state, it is difficult to achieve uniform mixing, and thus low uniformity in the composition and particle size of the final powder has been challenging.

In the conventional solid phase synthesis method, the mechanical mixing method is performed by ball milling or mortar grinding. The ball milling involves rotating at a few tens to a few hundreds of rpm, and grinding by collision energy between the rising and falling balls and the raw material. In the case of the ball milling, energy applied per unit weight of the raw material is at the level of a few to a few tens of J, and it takes a few to a few tens of hours to grind, and besides, forces are not strong, which places limitations on particle size reduction or mixing to have uniform composition.

Figure 1:
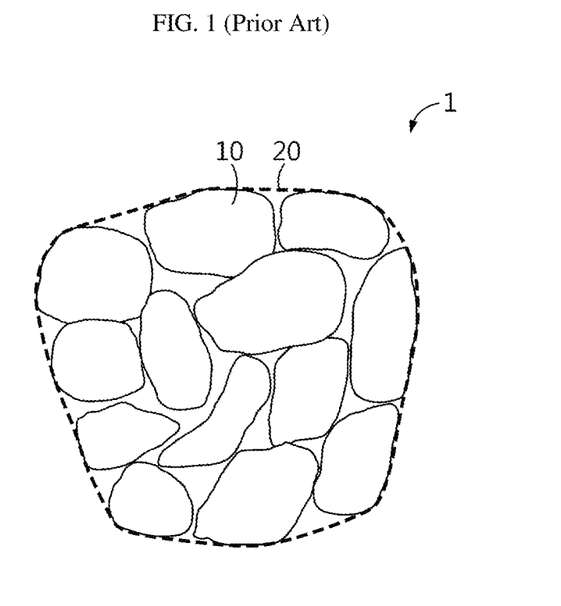
FIG. 1 is a schematic diagram of a conventional positive electrode active material.

Meanwhile, the conventional positive electrode active material particle 1 is a polycrystalline multi-particulate material in the form of a secondary particle 20 formed by agglomeration of primary particles 10 as shown in FIG. 1. A particle that is formed in a sufficiently large size to physically distinguish by agglomeration of the primary particles 10 which are a small unit is referred to as the secondary particle 20. The conventional positive electrode active material particle 1 has a large specific surface area and low particle strength. In particular, due to the high contact surface with the electrolyte solution, the thermal properties are degraded severely by the repeated charge/discharge cycles, causing cracks and consequential new surface exposure, resulting in severe gas generation by side reactions. In this circumstance, there is a need for a positive electrode active material in the form of a single particle in the industry.

DISCLOSURE

Technical Problem

The present disclosure is directed to providing a method for manufacturing a nickel-rich NCM positive electrode active material by a solid phase synthesis method.

The present disclosure is further directed to providing a positive electrode active material in the form of a single particle.

Technical Solution

To achieve the above-described object, a method for manufacturing a positive electrode active material according to the present disclosure includes mixing and grinding raw material particles to obtain ground product particles, where the raw material particles are source materials for a lithium composite transition metal oxide; sintering the ground product particles to synthesize the lithium composite transition metal oxide; and disaggregating and classifying the synthesized lithium composite transition metal oxide to obtain a positive electrode active material powder, wherein the mixing and grinding the raw material particles includes placing the raw material particles and beads into a chamber of a grinding device, where the grinding device includes a rotatable rotor in the chamber, and performing a dry process of mixing and grinding the raw material particles in the chamber by rotating the rotor to give kinetic energy to the beads, causing collisions between the beads and the raw material particles.

In the present disclosure, the ground product particles may be agglomerates of the ground raw material particles, and an average particles diameter (D50) of the ground raw material particles that form the agglomerates may be 2 μm or less in size.

The kinetic energy applied from the beads may be 200 to 2000 J per unit weight (1 kg) of the raw material particles.

A Maximum Relative Velocity (MRV) of the beads may be 9 to 18 m/s.

A cooling water may be provided into the chamber during the grinding and mixing of the raw material particles to prevent degradation of the raw material particles by heat generation.

In the present disclosure, the raw material particles may comprise a lithium source, a nickel source, a cobalt source and a manganese source, and a nickel content in the lithium composite transition metal oxide may be 85 mol % or more, relative to the total transition metal content in the lithium composite transition metal oxide.

The sintering may be performed at least once, and in this instance, a temperature of the primary sintering may range between 760° C. and 900° C.

The mixing and grinding of the raw material particles may further include rotating the rotor at a first speed during the grinding and mixing; and then rotating the rotor at a lower speed than the first speed or non-rotating the rotor; and then rotating the rotor at the first speed again during the grinding and mixing.

Preferably, the grinding may be performed after the raw material particles and the beads are filled to 5 to 60% of an internal volume of the chamber.

According to the present disclosure, there is provided a positive electrode active material in the form of a single particle manufactured by the method.

To achieve another object, the positive electrode active material according to the present disclosure is a positive electrode active material manufactured by solid phase synthesis by sintering ground product particles obtained by mixing and grinding raw material particles for lithium composite transition metal oxide preparation, the ground product particles are agglomerates of the ground raw material particles, an average particle diameter (D50) of ground raw material particles that form the agglomerates is 2 μm or less in size, and after sintering, the positive electrode active material in the form of a single particle is obtained.

The positive electrode active material according to the present disclosure is a lithium composite transition metal oxide comprising nickel, cobalt and manganese, wherein the lithium composite transition metal oxide has a nickel content of 85 mol % or more, relative to the total transition metal content in the lithium composite transition metal oxide, and the positive electrode active material is in a form of a single particle of monomodal particle size distribution.

The positive electrode active material may comprise single particles having an average particle size (D50) of 2 to 10 um.

A mole ratio (Li/M) of lithium (Li) to the total metal (M) except lithium in the lithium composite transition metal oxide may be 0.96 to 1.10.

The lithium composite transition metal oxide may have a uniform concentration of the nickel, cobalt and manganese in the single particles.

Advantageous Effects

According to the present disclosure, it is possible to manufacture a positive electrode active material powder for a lithium secondary battery having a small particle size and high composition uniformity for high charge/discharge capacity by the development of new technology of the solid phase synthesis method.

According to the present disclosure, it is possible to overcome the uniformity issue of the solid phase synthesis by improving the grinding and mixing process over the conventional solid phase synthesis method.

According to an aspect of the present disclosure, it is possible to obtain a positive electrode active material in the form of a single particle.

According to another aspect of the present disclosure, it is possible to manufacture a nickel-rich NCM positive electrode active material powder having the nickel content of 85 mol % or more in the form of a single particle. The nickel-rich NCM positive electrode active material of the present disclosure has large capacity and high stability. Specifically, the nickel-rich NCM positive electrode active material of the present disclosure has a small specific surface area and high particle strength, thereby preventing particle cracks during roll-press, and reducing the amount of lithium by-products and consequential side reactions with the electrolyte solution. Additionally, the nickel-rich NCM positive electrode active material of the present disclosure has high structural stability and chemical stability, thereby reducing the amount of gas produced during the operation of the cell, and ensuring thermal stability.

DESCRIPTION OF DRAWINGS

The accompanying drawings illustrate an embodiment of the present disclosure and together with the detailed description of the present disclosure, serve to provide further understanding of the technical features of the present disclosure, and thus, the present disclosure is not construed as being limited to the drawings.

BEST MODE

Hereinafter, embodiments of the present disclosure will be described with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just an embodiment of the present disclosure and do not fully describe the technical features of the present disclosure, so it should be understood that a variety of other equivalents and modifications could have been made thereto at the time of filing the patent application.

In the following description, reference is made to the accompanying drawings of the patent application. The embodiments described in the detailed description, the accompanying drawings and the appended claims are not intended to limit the present disclosure. Other embodiments may be used without departing from the aspect and scope of the present disclosure, and other changes may be made. The aspects of the present disclosure as described herein and shown in the accompanying drawings may be arranged, substituted, combined, split and designed into a variety of other configurations, and it will be immediately understood that all of them are taken into consideration.

Unless otherwise defined, all terms including technical and scientific terms used herein have the same meaning as commonly understood by one of ordinary skill in the art.

The present disclosure is not limited to particular embodiments described herein. As obvious to those skilled in the art, many changes and modification may be made without departing from the aspect and scope of the present disclosure. In addition to the description made herein, functionally equivalent methods within the scope of the present disclosure will be obvious to those skilled in the art from the foregoing description. Such changes and modification fall within the scope of the appended claims. The present disclosure will be defined by the appended claims and the scope of the equivalents to which the claims are entitled. It should be understood that the present disclosure is not limited to particular methods to which changes may be made. It should be understood that the terminology as used herein are used to describe particular embodiments, but not intended to being limiting.

Figure 2:
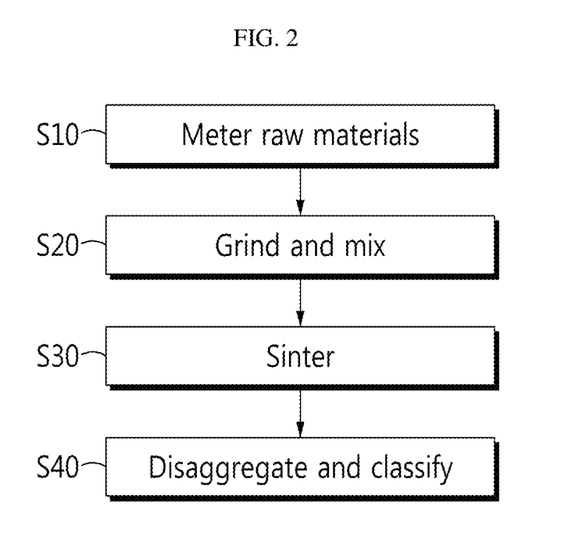
FIG. 2 is a flowchart of a method for manufacturing a positive electrode active material according to the present disclosure.

FIG. 2 is a flowchart of a method for manufacturing a positive electrode active material according to the present disclosure.

The process sequence is described with reference to FIG. 2 as follows.

First, raw material particles for lithium composite transition metal oxide preparation are metered (step s10).

For example, lithium composite transition metal oxide or NCM comprising nickel, cobalt and manganese may be prepared. A lithium source, a nickel source, a cobalt source and a manganese source as the raw material particles are metered. For example, the lithium source may be LiOH, the nickel source may be $Ni(OH)_2$, the cobalt source may be $Co_3O_4$, and the manganese source may be $MnO_2$.

The positive electrode active material may be nickel-rich NCM having the nickel content of 85 mol % or more as described above. Here, the standard for the nickel content refers to a ratio of nickel to the sum of the total number of moles of transition metal (nickel, cobalt, manganese) (except lithium). That is, the nickel content may be 85 mol % or more in the total transition metal content. The nickel content may be 98 mol % or less. For example, the nickel:cobalt:manganese content may be 88:5:7. Additionally, a ratio of lithium to other metals in NCM may be 0.96 to 1.10. That is, a mole ratio Li/M of lithium (Li) to the total metal M except lithium may be 0.96 to 1.10. When considering the improvement effect of the capacity characteristics of the positive electrode active material by the control of the lithium content and the effect of the formation of a single particle in the manufacture of the positive electrode active material, Li/M is preferably 0.96 to 1.10. When Li/M is smaller than 0.96, the capacity may decrease, and when Li/M is larger than 1.10, the resistance may increase due to much lithium remaining on the positive electrode active material surface. Preferably, Li/M may be 0.98 to 1.05, and more preferably 1.00 to 1.04. Further to the adjustment of the amount of the lithium raw material to satisfy the above-described Li/M in the manufacture of the positive electrode active material, special dry grinding and mixing can manufacture the positive electrode active material in the form of a single particle even in the case of the lithium composite transition metal oxide having the nickel content of 85 mol % or more.

The raw material particles are metered to have a desired composition. For doping, elements such as Al, Zr may be added in a small amount of, for example, 0.1 to 2%. These elements may play a role in promoting the particle growth by increasing the surface energy of the positive electrode active material. When the nickel content is preferably 65 mol % or more, it is possible to ensure high capacity, and when the nickel content is 85 mol % or more as proposed, it is possible to ensure higher capacity. In general, as the nickel content is higher, the structural and chemical stability of the NCM lithium composite transition metal oxide is lower and it is more difficult to ensure thermal stability. Even though the nickel content is high, the present disclosure manufactures the positive electrode active material in the form of a single particle by special dry grinding and mixing thereby ensuring stability. Subsequently, the metered raw material particles are mixed and ground (step s20). In this instance, a grinding device capable of high energy grinding is used. In the method for manufacturing a positive electrode active material according to the present disclosure, the high energy grinding used in the mixing and grinding step may use the grinding device including a chamber and a rotor in the chamber.

Figure 3A:
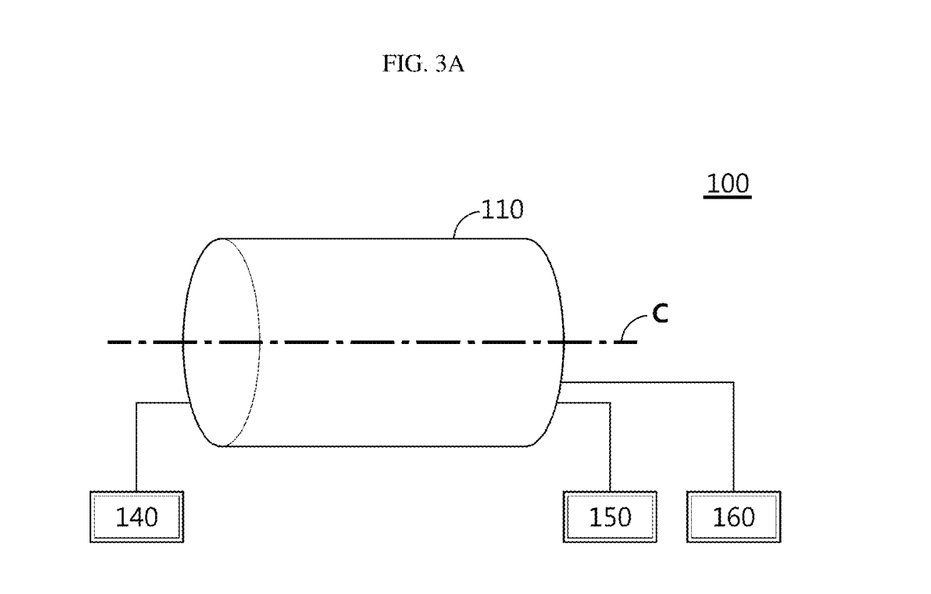
FIGS. 3A and 3B are schematic diagrams of a grinding device that may be used in a method for manufacturing a positive electrode active material according to the present disclosure.
Figure 3B:
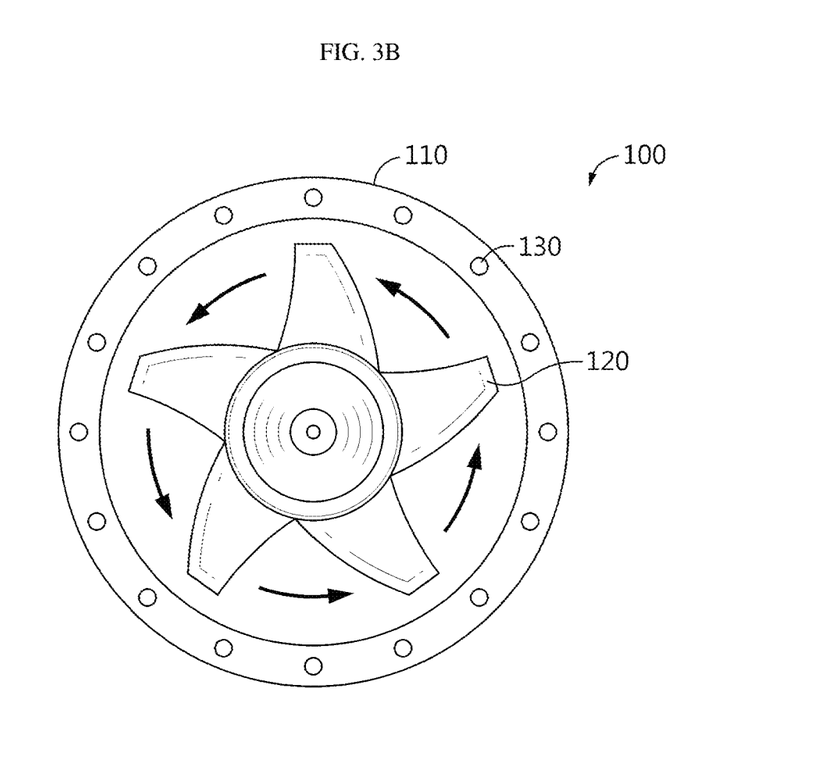

FIGS. 3A and 3B are schematic diagrams of the grinding device that may be used in the method for manufacturing a positive electrode active material according to the present disclosure.

FIG. 3A is a side view of the grinding device, and FIG. 3B is a front view of the grinding device shown in FIG. 3A with the chamber being open.

Referring to FIGS. 3A and 3B, the grinding device 100 includes the cylindrical chamber 110 in which a central axis C is horizontally placed and the rotor 120 capable of high speed rotation on the central axis inside. The rotation axis of the rotor 120 is horizontally placed and matched with the central axis of the chamber 110. Since the rotation axis of the rotor 120 is horizontal and the raw material particles rotate along the rotation axis, it may be referred to as a horizontal mill. The rotor 120 includes at least one rotating wing coupled to the rotation axis (a center rod of the rotor). The number of rotating wings, the wing size and the angle of each wing may be changed to adjust the rotational force.

The chamber 110 may have at least one inlet through which beads and the raw material particles may be put or taken. The chamber 110 is a closed system, and the internal environment may be adjusted using air or Ar.

The grinding device 100 may further include a driving unit 140 to supply power to the rotor 120, an environment control unit 150 including a pump, a valve and a gas supply unit to adjust the internal environment of the chamber 110, and a cooling system 160 including a cooling water supplier and a cooling water line to cool the chamber 110. The grinding device 100 is designed to grind with the application of high kinetic energy E by the rotation of the rotor 120 at a high speed of, for example, 1000 rpm or more after putting the beads and the raw material particles in the chamber 110. The mixing and grinding is performed by a dry process in a manner of transferring kinetic energy E to the beads by the high speed rotation of the rotor 120 to cause collisions between the beads and the raw material particles, and as a result, ground product particles necessary for solid phase synthesis may be obtained. Since the dry process is used, a medium is not added. Since the medium is not used, energy from the beads is directly transmitted from the raw material particles, so it is energy efficient, and medium filtration and drying is unnecessary, and thus the process is simple. The kinetic energy E of the beads is represented as $E=½ mv^2$ (where m: the mass of the beads, v: Maximum Relative Velocity (MRV) of the beads). The maximum relative velocity v may be 9 to 18 m/s. When the Maximum Relative Velocity v is less than 9 m/s, sufficient impacts are not transmitted to the raw material particles, thereby failing to finely grind the raw materials. When the maximum relative velocity v exceeds 18 m/s, too much energy consumption results in inefficiency. The mass m of the beads may change depending on the size of the chamber 110 of the grinding device 100.

The kinetic energy E applied from the beads per unit weight (1 kg) of the raw material particles may be about 200 to 2000 J. When the kinetic energy applied per unit weight is less than 200 J, uniform grinding and mixing is not achieved due to insufficient energy, and when the kinetic energy exceeds 2000 J, it is difficult to control the heat generation, causing degradation of the raw materials and cost increases.

The conventional ball milling method grinds only by collision energy between the rising and falling balls and the raw materials. In contrast, high energy grinding using the grinding device 100 as proposed further applies high kinetic energy E by the rotation of the rotor 120. Accordingly, the grinding and mixing effect is superior over the ball milling, and it is possible to achieve grinding of the same level in a few minutes to a few hours. Additionally, a cooling water line 130 is formed in the outer walls (outer periphery) of the chamber 110 to allow cooling water to flow through the cooling water line 130, thereby preventing the raw materials from being degraded by heat generation during grinding and mixing. As the chamber size increases, when only cooling the outer periphery of the chamber is not sufficient, it is possible to make up for insufficient cooling by flowing the cooling water to the rotation axis of the rotor 120.

In case that only the cooling water flowing along the outer walls of the chamber 110 is not sufficient to cool the beads and the raw materials, the method may include a cooling step by low speed rotation or non-rotation of the rotor 120 in the middle of grinding. That is, the method may include rotating the rotor 120 at a first speed during grinding and mixing; and performing low speed rotation at a smaller speed than the first speed or non-rotation in the middle of the step of rotating the rotor 120 at the first speed.

It is desirable to grind after filling the raw materials and the beads up to 15 to 60% of the internal volume of the chamber 110. When the volume of the content in the chamber 110 is less than the above-described range, the energy of the rotating wings of the rotor 120 is not sufficiently transmitted to the beads, thereby reducing the grinding efficiency, and when the volume of the content in the chamber 110 is more than the above-described range, grinding is not performed well due to an insufficient space to cause collision between the raw materials and the beads and the raw material are deposited on the inner walls of the chamber 110, resulting in low yield.

The beads used in the grinding may have a spherical shape and may be high purity ceramic balls having abrasion resistance for use in ball milling. The bead density may be 5.5 g/cm³ or more and the bead diameter may be 3.8 mm or more and 10 mm or less. When the density is smaller than the above-described range or the diameter is smaller than the above-described range, sufficient impacts may not be transferred to the raw materials. When the diameter exceeds the above-described range, the collision area reduces and there is a dead zone at which collision does not occur, resulting in low grinding efficiency. Two types of beads having different diameters may be used in combination.

A weight ratio of the beads and the raw materials may be 2.5:1 to 25:1. The weight ratio may be determined, taking the grinding efficiency and the yield into account.

As a result of fine grinding by the high energy grinding method, the primary particles that form agglomerates in the ground product particles after the mixing and grinding step have the average particle size D50 (a particle diameter at 50% of the distribution occupied by a certain particle, and also known as the medium diameter or average particle size) of 2 μm or less. In the ground product particles, each ground raw material particle is mixed in agglomerated form. Since the primary particle size of the ground product particles is 2 μm or less, it is possible to have a uniform composition after sintering and manufacture in the form of a single particle of a desired size. When the primary particle size of the ground product particles is larger than 2 um, it is difficult to have a uniform composition after sintering and manufacture a single particle. In general, when ground by the conventional solid phase synthesis method, the D50 of the ground product particles is 3 μm or more.

For reference, the average particle size D50 may be defined as a particle size at 50% of the volume cumulative distribution in the particle size distribution curve. The average particle size D50 may be measured, for example, using a laser diffraction method. For example, the method for measuring the average particle size D50 includes dispersing a sample in a dispersing medium, introducing into a commercially available laser diffraction particle size measurement device (for example, Microtrac MT 3000), irradiating an ultrasound of about 28 kHz with the output of 60 W, and calculating the average particle size D50 corresponding to 50% of volume cumulative distribution in the measurement device.

Subsequently, the ground product particles obtained in the previous step are sintered to synthesize lithium composite transition metal oxide (step s30). It is solid phase synthesis in which all steps are performed in solid phase. The sintering may be performed twice or more, and in this instance, the secondary sintering and its subsequent sintering are intended to remove fine powder or control the particle shape. The primary sintering temperature may range between 760° C. and 900° C. In the manufacture of the NCM positive electrode active material, as the nickel content is higher, the sintering temperature is lower. The sintering may remove gas inside the ground product particles, and form bonds between metal ions and oxygen. Stable bonds may be formed between metal ions and oxygen, and thermal energy may be used in the particle growth. When the sintering temperature is less than 760° C., bonds between metal ions and oxygen are not sufficiently formed, and when the sintering temperature is higher than 900° C., metal oxide lamination may occur. The sintering may be performed under an air environment or oxygen environment.

The lithium composite transition metal oxide synthesized through sintering is disaggregated and classified to obtain a positive electrode active material powder (step s40). As a result of sintering and disaggregating the primary particles having the D50 of 2 μm or less that form agglomerates as the ground product particles, the positive electrode active material in the form of a single particle may be obtained. The disaggregation separates the necking of the positive electrode active material particles through a pin mill.

Figure 4A:
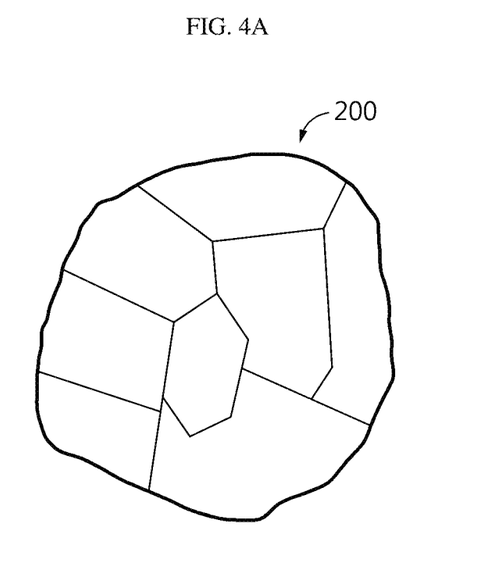
FIGS. 4A and 4B are a schematic diagrams of a positive electrode active material according to the present disclosure.
Figure 4B:
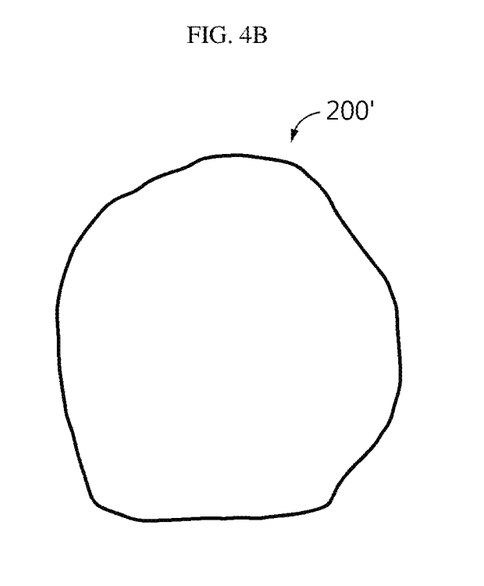

FIG. 4 is a schematic diagram of the positive electrode active material according to the present disclosure.

As shown in FIGS. 4A and 4B, according to the present disclosure, the positive electrode active material may be manufactured in the form of a polycrystalline single particle 200 as shown in FIG. 4A or a monocrystalline single particle 200' as shown in FIG. 4B. The 'particle' refers to a particle of a micrometer unit, and when it is observed with magnification, it may be identified as a 'grain' having a crystal shape of a few tens of nanometers. FIG. 4A is the polycrystalline particle having multiple lattice structure orientations, and FIG. 4B is the monocrystalline particle having single lattice structure orientation. The polycrystalline single particle 200 shown in FIG. 4A allows easier electron movement through the grain boundary than the structure of FIG. 1 and thus has high electron conduction, and has superior thermal properties due to its small contact surface with the electrolyte solution. Compared to the structure shown in FIG. 4A, the monocrystalline single particle 200' shown in FIG. 4B has a lattice structure in a uniform direction and thus has a short movement path of Li+.

In the present disclosure, 'primary particle' refers to a primary structure of a single particle, and 'secondary particle' refers to a secondary structure, i.e., an agglomerate by physical or chemical bonding between the primary particles without an intentional agglomeration or assembly process of the primary particles that form secondary particles. The secondary particle refers to a particle that is formed in a sufficiently large size to physically distinguish by agglomeration of primary particles which is a small unit.

The average particle size D50 of the primary particles that form agglomerates in the ground product particles after the mixing and grinding step is equal to or less than 2 μm in size. The average particle size D50 of the primary particles of the positive electrode active material manufactured by sintering may be 2 to 10 um. More preferably, the average particle size D50 of the primary particles may be 3 to 7 μm. In the case of the positive electrode active material in the form of a single particle having the above-described average particle size D50 of the primary particles, the particle strength may increase, thereby preventing particle cracks during roll-pressing, the press density may be improved, the specific surface area may be reduced, lithium by-products may be reduced and the amount of gas produced by the side reactions with the electrolyte solution may be reduced.

As the average particle size D50 of the primary particles of the positive electrode active material increases, the gas reduction effect increases, thereby preventing the resistance increase, resulting in longer cycling lifespan. As described above, the positive electrode active material in the form of a single particle according to the present disclosure has good thermal properties due to the small contact surface with the electrolyte solution. It is possible to prevent cracking and improve the cycling lifespan. The increase in resistance in 600 cycles is less than 28%. It is possible to reduce the gas generation by 30%.

The positive electrode active material manufactured by the conventional method is in the form of a secondary particle formed by agglomeration of primary particles as described in FIG. 1. By this reason, due to the high contact surface with the electrolyte solution, thermal properties are significantly degraded by the repeated charge/discharge cycles, causing cracks and consequential new surface exposure, resulting in severe gas generation by side reactions. In addition, the nickel-rich NCM produces a large amount of gas due to a large amount of residual lithium, and thus it is difficult to deal with it. According to the present disclosure, it is possible to manufacture nickel-rich NCM in the form of a single particle as shown in FIG. 4, thereby preventing gas generation.

According to another aspect of the present disclosure, there may be provided a positive electrode for a lithium secondary battery comprising the positive electrode active material and a lithium secondary battery.

Specifically, the positive electrode includes a positive electrode current collector and a positive electrode active material layer formed on the positive electrode current collector, the positive electrode active material layer comprising the positive electrode active material. In addition to the positive electrode active material, the positive electrode active material layer may comprise a conductive material and a binder. The positive electrode may be manufactured by the common positive electrode manufacturing method except using the positive electrode active material according to the present disclosure. Specifically, the positive electrode may be manufactured by coating a positive electrode active material layer forming composition comprising the positive electrode active material and optionally, the binder and the conductive material on the positive electrode current collector, drying and rolling.

Specifically, the lithium secondary battery includes, a positive electrode, a negative electrode disposed opposite the positive electrode, a separator interposed between the positive electrode and the negative electrode and an electrolyte solution, and the positive electrode is the same as described above. Additionally, the lithium secondary battery may further include a battery container in which the electrode assembly comprising the positive electrode, the negative electrode and the separator is received, and a sealing member which seals the battery container.

In the lithium secondary battery, the negative electrode comprises a negative electrode current collector and a negative electrode active material layer disposed on the negative electrode current collector. The negative electrode active material layer comprises a negative electrode active material and optionally a binder and a conductive material. For example, the negative electrode active material layer may be formed by coating a negative electrode forming composition comprising the negative electrode active material, and optionally the binder and the conductive material on the negative electrode current collector and drying.

The lithium secondary battery comprising the positive electrode active material according to the present disclosure stably shows good discharge capacity, output characteristics and capacity retention, and thus is useful in the field of mobile devices including mobile phones, laptop computer, and digital cameras and electric vehicles including hybrid electric vehicles (HEVs).

After the positive electrode active material is manufactured by the method according to the present disclosure, an electrode is manufactured and a coin half cell test is performed, and it is found that the charge/discharge capacity value and rated characteristics are improved compared to the positive electrode active material manufactured by ball milling and grinding using a mortar. It is attributed to the increase in composition uniformity of each metal element during sintering by the even better grinding and mixing effect than the conventional method. According to the present disclosure, it is possible to manufacture the nickel-rich NCM positive electrode active material in the form of a single particle having high composition uniformity that was difficult to achieve by the conventional solid phase synthesis method.

Hereinafter, an experimental example of the present disclosure will be described in more detail.

EXPERIMENTAL EXAMPLE

Example 1

78.3 g of LiOH, 159.2 g of Ni(OH)$_2$, 6.0 g of Co$_3$O$_4$ and 6.5 g of MnO$_2$ are metered and put into a grinding device together with 2.5 kg of zirconia beads having the diameter of 5 mm. Subsequently, mixing and grinding is performed by rotating a rotor at 1600 rpm for 30 minutes. In this instance, kinetic energy applied from beads per unit weight of the raw material is 470 J, and the maximum relative velocity of the beads is about 9.7 m/s. 60 g of the raw material powder obtained through the grinding and mixing is taken and put into a furnace and sintered at 850° C. for 10 hours to prepare metal composite oxide. The sintered metal composite oxide is disaggregated and classified to obtain a dark grey or black positive electrode active material powder. The positive electrode active material powder is mixed with a conductive material, a binder and a solvent to prepare a slurry, and the slurry is coated on an aluminum foil using a doctor blade to manufacture an electrode (the slurry is prepared by metering 96.25 wt % of the positive electrode active material, 1.5 wt % of carbon black as the conductive material, and 2.25 wt % of PVdF as the binder and mixing with NMP). The manufactured electrode is punched, and used to manufacture a Coin Half Cell (CHC). The CHC is put in a charger/discharger and measured for the initial charge/discharge value (0.2 C) and the rate characteristics (0.5 C to 1.0 C, 0.5 C to 2 C). The voltage is 3 to 4.25V, and the initial formation charging/discharging is performed at 0.1 C/0.1 C. An electrolyte solution of the cell comprises Ethylene carbonate (EC):Ethyl methyl carbonate (EMC) =3:7 and some additives.

Example 2

94 g of LiOH, 191 g of Ni(OH)$_2$, 7.2 g of Co$_3$O$_4$ and 7.8 g of MnO$_2$ are metered and put into a chamber of a grinding device together with 2.5 kg of zirconia beads having the diameter of 5 mm. Subsequently, mixing and grinding is performed by rotating a rotor at 1500 rpm for 60 minutes. In this instance, kinetic energy applied from beads per unit weight of the raw material is 338 J, and the maximum relative velocity of the beads is about 9 m/s. 60 g of the raw material powder obtained through the grinding and mixing is taken and put into a furnace and a positive electrode active material powder and an electrode are manufactured through the same procedure as example 1.

Example 3

78.3 g of LiOH, 159.2 g of Ni(OH)$_2$, 6.0 g of Co$_3$O$_4$ and 6.5 g of MnO$_2$ are metered and put into a chamber of a grinding device together with 2.5 kg of zirconia beads having the diameter of 5 mm. Subsequently, mixing and grinding is performed by rotating a rotor at 1950 rpm for 30 minutes. In this instance, kinetic energy applied from beads per unit weight of the raw material is 720 J, and the maximum relative velocity of the beads is about 12 m/s. 60 g of the raw material powder obtained through the grinding and mixing is taken and put into a furnace and a positive electrode active material powder and an electrode are manufactured through the same procedure as example 1.

Comparative Example 1

The same composition as example 1, i.e., 78.3 g of LiOH, 159.2 g of Ni(OH)$_2$, 6.0 g of Co$_3$O$_4$, and 6.5 g of MnO$_2$ are metered, and put into a Nalgene bottle and then a ball mill together with 2.5 kg of zirconia balls having the diameter of 5 mm. Subsequently, mixing and grinding is performed at 150 rpm for 24 hours. In this instance, energy applied per unit weight of the raw material is 10 J or less. 60 g of the raw material powder obtained through the grinding and mixing is taken and put into a furnace and a positive electrode active material powder and an electrode are manufactured through the same procedure as example 1.

Comparative Example 2

18.8 g of LiOH, 38.2 g of Ni(OH)$_2$, 1.4 g of Co$_3$O$_4$ and 1.6 g of MnO$_2$ are metered, put into a mortar, and ground and mixed for 1 hour. In this instance, energy applied per unit weight of the raw material is 20 J or less. The raw material powder obtained through the grinding and mixing is put into a furnace and a positive electrode active material powder and an electrode are manufactured through the same procedure as example 1.

Table 1 summaries the conditions and experimental results of comparative examples 1 and 2 and examples 1 to 3.

TABLE 1

| | Energy applied per unit weight of raw material particles (J) | Particle size of ground product (D50, um) | Charge capacity (0.2 C) | Discharge capacity (0.2 C) | 0.5 C/ 1.0 C Rate | 0.5 C/ 2.0 C Rate |
|---|---|---|---|---|---|---|
| Comparative example 1 | 10 or less | 11.5 | 230.4 mAh/g | 177.2 mAh/g | 90.90% | 82.20% |
| Comparative example 2 | 20 or less | 8.7 | 223.5 mAh/g | 176.3 mAh/g | 90.40% | 83.10% |
| Example 1 | 470 | 1.5 | 239.8 mAh/g | 190.8 mAh/g | 94.10% | 89.50% |
| Example 2 | 338 | 1.2 | 239.6 mAh/g | 191.4 mAh/g | 95.00% | 90.90% |
| Example 3 | 720 | 0.9 | 240.0 mAh/g | 193.2 mAh/g | 94.00% | 89.50% |

As a result of particle size analyzer (PSA) measurement of the ground product particles obtained after grinding, the average particle size D50 of comparative example 1 is 11.5 um, and the average particle size D50 of comparative example 2 is 8.7 um. According to embodiments of the present disclosure, D50 of the primary particle agglomerate is 2 μm or less, and example 1 is 1.5 um, example 2 is 1.2 um, and example 3 is 0.9 um. As described above, the raw material particles ground by the present disclosure are ground into very small particles and form an agglomerate. The D50 of the primary particle agglomerate is 2 μm or less in size. In contrast, after grinding by the conventional method, the average particle size D50 of the raw material particles is as large as 3 μm or more.

It can be seen that examples 1 to 3 show improved charge/discharge capacity value and rated characteristics compared to comparative examples 1 and 2. Due to the even better grinding and mixing effect than the conventional method, the raw material particles are ground to a small size and uniformly mixed, leading to the increased composition uniformity of each metal element during sintering. As described above, according to the present disclosure, it is possible to manufacture a nickel-rich NCM positive electrode active material having high composition uniformity in the form of a single particle that has been difficult to achieve by the conventional solid phase synthesis method.

Figure 5:
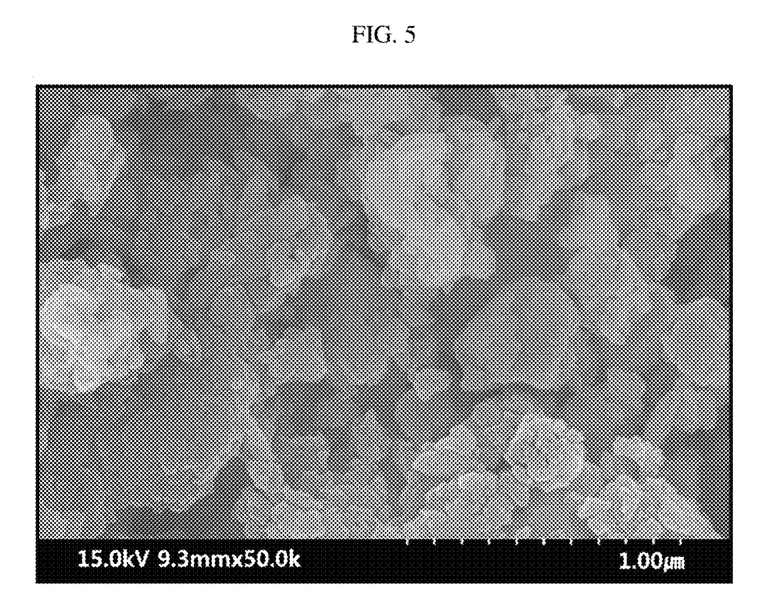
FIG. 5 is a scanning electron microscopy (SEM) image of raw material particles ground by the present disclosure.

FIG. 5 is a scanning electron microscopy (SEM) image of the raw material particles ground by the present disclosure. Since the ground particles form an agglomerate, the particle agglomerate may be recognized as a particle on the SEM or PSA. As a result of SEM measurement, since primary particles form an agglomerate, the particles may look larger than 2 um.

Since fine grinding is possible, after the grinding step (s20) in the manufacturing method according to the present disclosure, the average particle size D50 of the ground product particles is 2 μm or less. Additionally, it is not good to unconditionally reduce the size, and it is important to obtain almost monosize with a small amount of finer particles, and when the grinding device of a high energy grinding method as proposed is used, it is possible to obtain monosized ground product particles of small size in a short time. After grinding, in the ground product particles, each raw material particle is mixed in agglomerated form. Accordingly, it is possible to have a uniform composition during sintering and manufacture a single particle of a desired size.

Figure 6A:
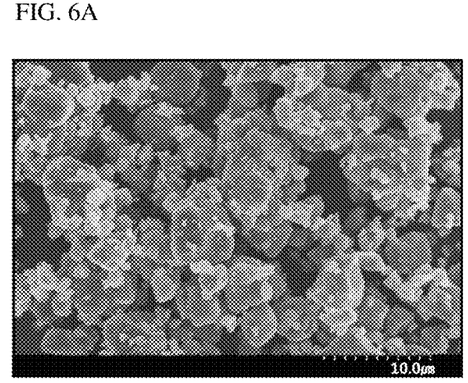
FIGS. 6A to 6D are SEM images of positive electrode active materials according to experimental example.
Figure 6B:
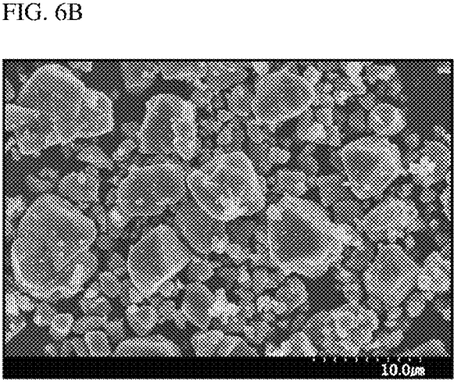
Figure 6C:
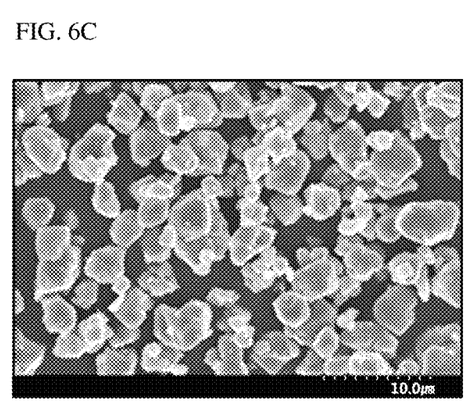
Figure 6D:
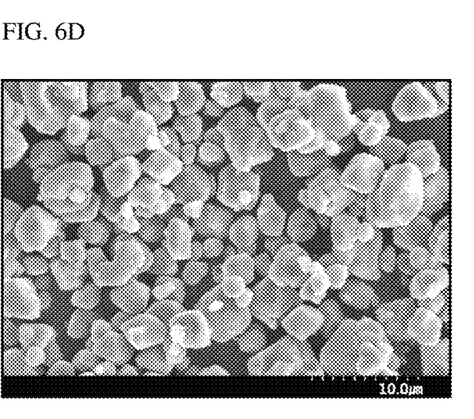

FIGS. 6A to 6D are SEM images of positive electrode active materials according to experimental example. FIG. 6A shows the positive electrode active material of comparative example 1 after sintering. FIG. 6B shows the positive electrode active material of comparative example 2 after sintering. FIG. 6C shows the positive electrode active material of example 1 after sintering. FIG. 6D shows the positive electrode active material of example 2 after sintering. It can be seen in the SEM image that in the case of comparative examples 1 and 2, there are many fine particles of 1 μm or less and the particle size uniformity reduces after sintering. In particular, it can be also seen that when the ball mill is used like comparative example 1, the positive electrode active material particles form an agglomerate. As a result of comparing the SEM images, in examples 1 and 2 of the present disclosure, there are a small amount of fine particles and single particles of uniform size are formed. That is, according to comparative examples, bimodal particle size distribution is obtained due to the large amount of fine particles, but according to the embodiments of the present disclosure, almost monosized particle size distribution can be obtained. The monosized particle size distribution can be also a monomodal particle size distribution, and when analyzed using a particle size analyzer (Dynamic Light Scattering: DLS, Nicomp 380), the monomodal may be defined as distribution with the standard deviation in the range of 1% or more and less than 40%, and preferably, 1% or more and 35% or less. In contrast, the bimodal of comparative examples has the standard deviation of 40% or more when determining the particle size and distribution using the particle size analyzer. When the standard deviation is equal to or larger than 40%, at least two particle size peaks may appear.

As described above, according to the present disclosure, since the improved grinding and mixing step is performed, uniformity and homogeneity of raw material powder and its particle size is controlled very suitably for solid phase synthesis. Such feature greatly affects not only the sintering characteristics but also the electrical properties, and thus it is possible to manufacture a positive electrode active material with high quality.

Comparative Example 3

A nickel-rich NCM positive electrode active material of the similar composition to example 1 is manufactured using the coprecipitation method well known in the technical field, and an electrode is manufactured by the same method as example 1 using the nickel-rich NCM positive electrode active material. The coprecipitation method is used for precursor precipitation. The positive electrode active material is obtained by washing and drying the precipitated precursor, and mixing with Li and sintering. In contrast, since the positive electrode active material according to the present disclosure is obtained by raw material mixing, grinding and sintering, the process is simplified compared to the coprecipitation method.

Figure 7:
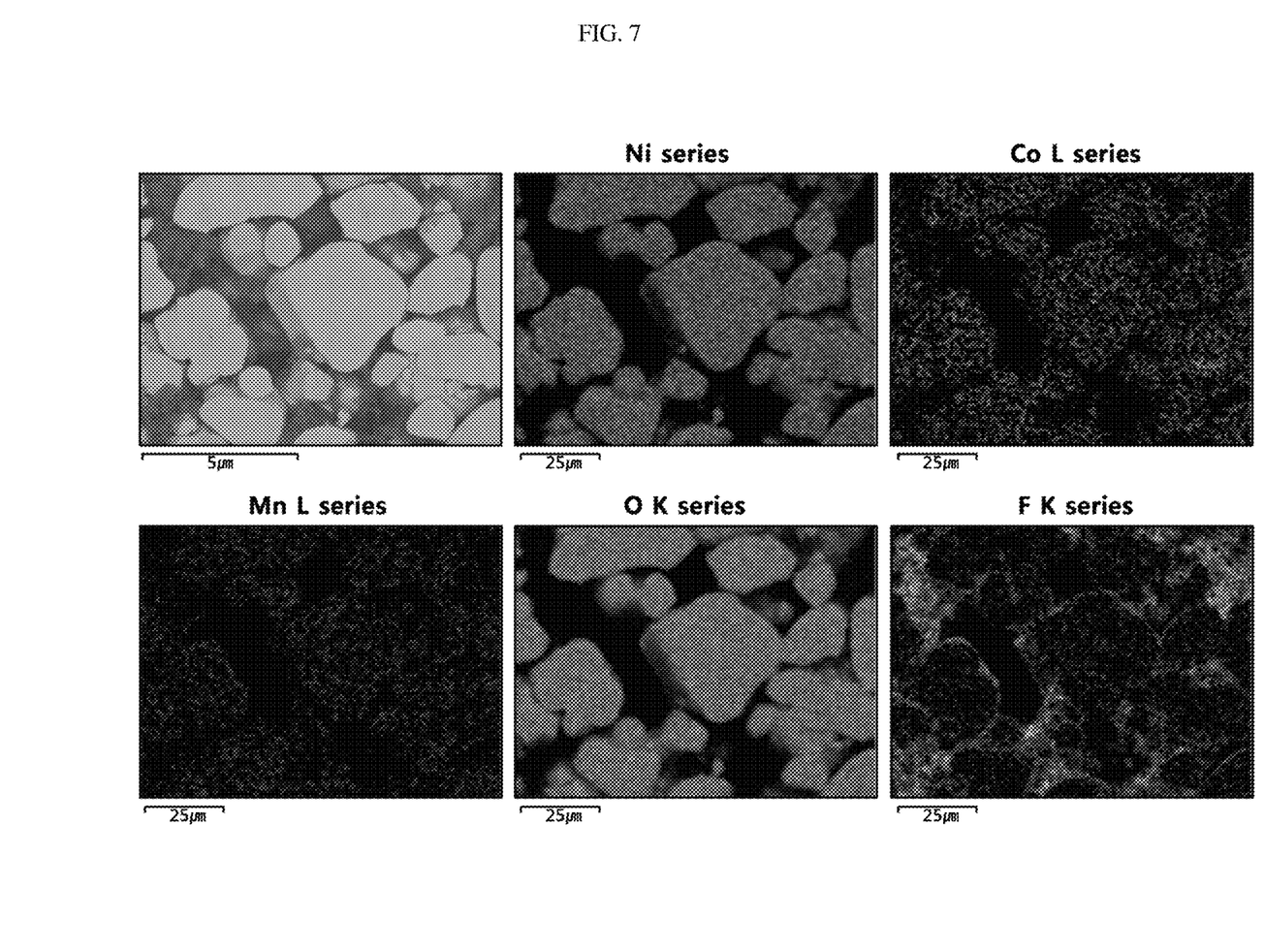
FIG. 7 is a photographic image showing electron probe microanalysis (EPMA) measurement of an electrode of example 1.
Figure 8:
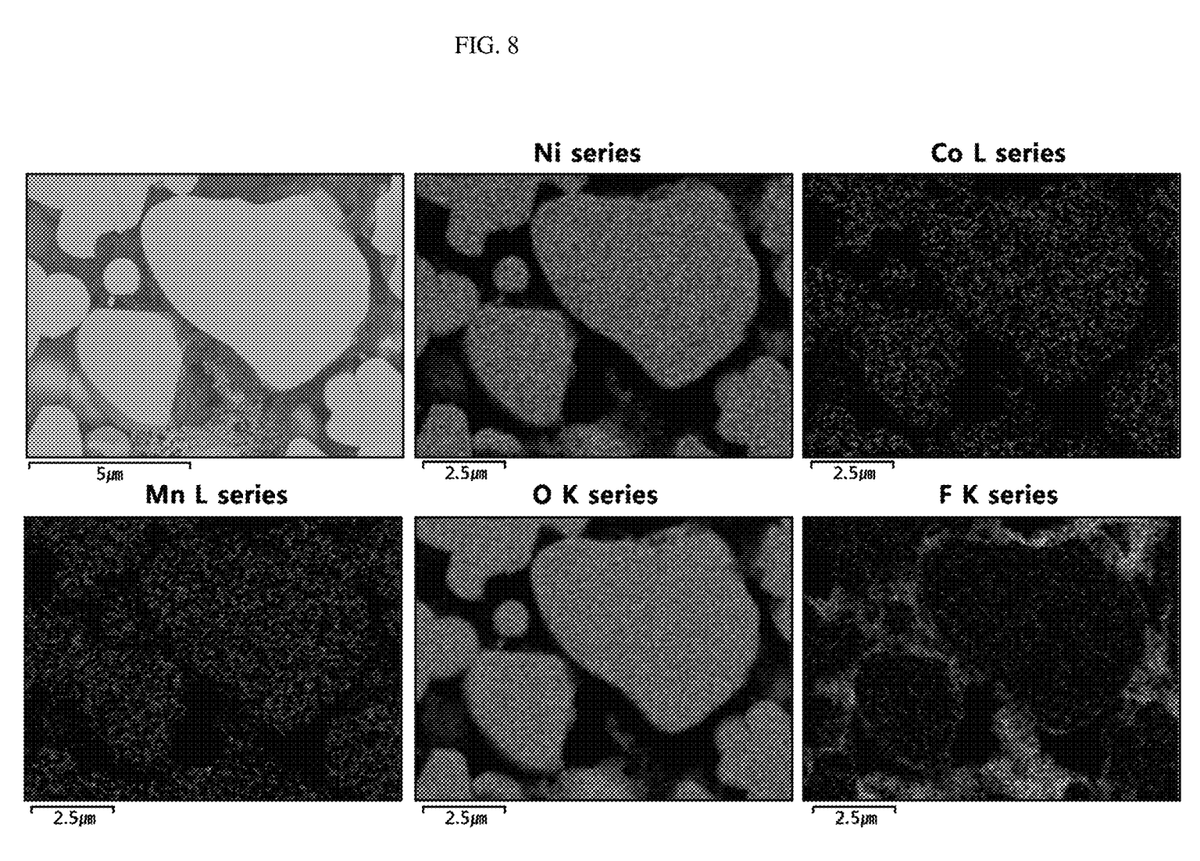
FIG. 8 is a photographic image showing EPMA measurement of an electrode of comparative example 3.

FIG. 7 is a photographic image of electron probe microanalysis (EPMA) measurement of the electrode of example 1, and FIG. 8 is a photographic image of EPMA measurement of the electrode of comparative example 3. The EPMA is well known as a method that determines the concentration and distribution of elements in solid samples through X-ray analysis by EDS after sample particle impact by electron beam. FIGS. 7 and 8 show L-K characteristic X-ray results. The Ni, Co, Mn, O results show the positive electrode active material composition distribution, and it can be seen through the distribution of points on the image that each element is uniformly distributed in the particle. The F result is the binder derived composition distribution, and shows distribution on the particle surface.

As can be seen from FIG. 7, the positive electrode active material according to the present disclosure has a uniform concentration of nickel, cobalt and manganese in the lithium composite transition metal oxide particle. According to the EPMA analysis results, it is interpreted that the uniform concentration of nickel, cobalt and manganese in the lithium composite transition metal oxide particle includes not only the equal concentration of nickel, cobalt and manganese irrespective of the location in the particle over the entire particle, but also the concentration of nickel, cobalt and manganese with a difference between the maximum concentration and the minimum concentration of 1.5 mol % or less over the entire particle.

In the case of the conventional solid phase synthesis method, its disadvantage is electrode performance degradation caused by non-uniformity of the composition of the final powder. However, when comparing FIGS. 7 and 8, it can be seen that the EPMA results of the positive electrode active material obtained through high energy grinding according to the present disclosure are at the equivalent level to the EPMA results of the positive electrode active material obtained through the coprecipitation method. That is, it can be seen that the positive electrode active material according to the present disclosure has the equivalent level of composition uniformity to the positive electrode active material obtained by the coprecipitation method, and thus the disadvantage of the conventional solid phase synthesis method can be solved.

Figure 9:
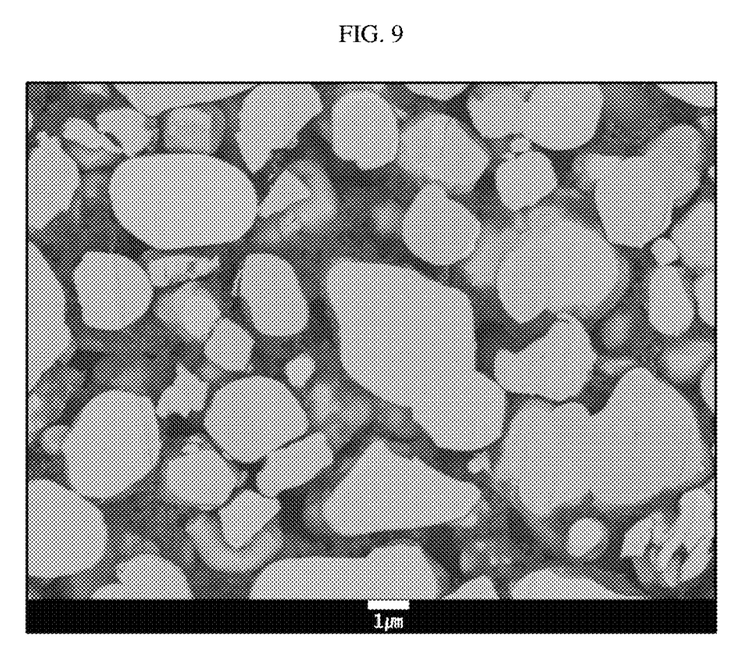
FIG. 9 is a cross-sectional SEM image of an electrode according to example 1.
Figure 10:
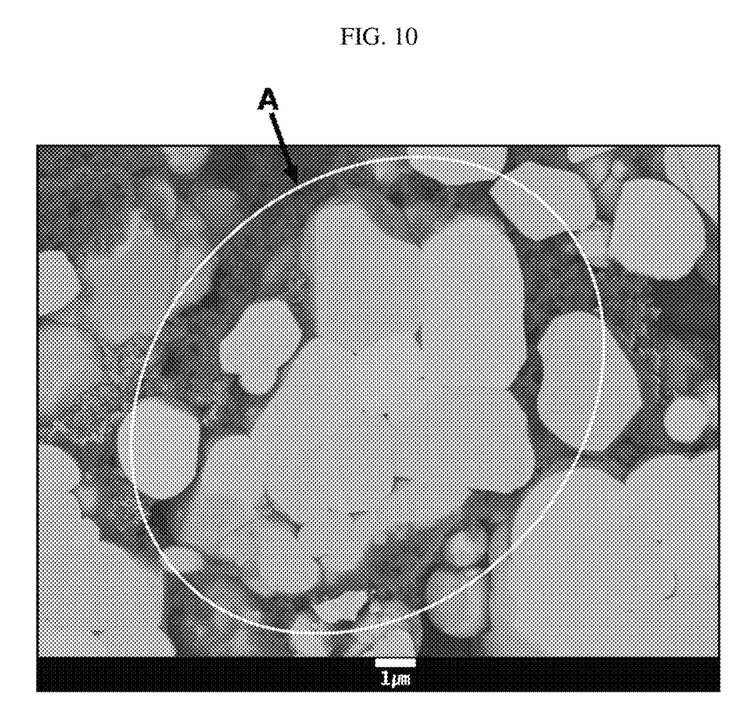
FIG. 10 is a cross-sectional SEM image of an electrode according to comparative example 3.

FIG. 9 is a cross-sectional SEM image of the electrode according to example 1, and FIG. 10 is a cross-sectional SEM image of the electrode according to comparative example 3.

Referring to FIG. 9, in the positive electrode active material obtained through high energy grinding according to the present disclosure, it is found that each particle is physically separated from each other and almost all particles are single particles. In FIG. 10, a plurality of particles in the shape of primary particle agglomerate like bunches of grapes is observed in the area A. In other words, a plurality of particles is observed as shown in FIG. 1. The positive electrode active material according to the present disclosure has a ratio of the single particle and the agglomerated particle of 99:1 or more in the entire particle.

The method for manufacturing a positive electrode active material according to the present disclosure uses the solid phase synthesis method, and thus as opposed to the coprecipitation method, it is possible to achieve mass production by a relatively simple synthesis process, and it is particularly appropriate for manufacturing nickel-rich NCM having high nickel content. The introduction of the high energy grinding method into the mechanical mixing of raw material powder in solid state achieves uniform mixing, thereby increasing the composition and particle size uniformity of the final powder that has been considered as the problem of the conventional mechanical mixing method such as ball milling.

While the present disclosure has been described with respect to a limited number of embodiments and drawings, the present disclosure is not limited thereto, and it will be apparent to those skilled in the art that a variety of changes and modifications may be made thereto within the technical aspects of the present disclosure and the appended claims and their equivalent scope.

What is claimed is:

1. A method for manufacturing a positive electrode active material, comprising:
   mixing and grinding raw material particles to obtain ground product particles, wherein the raw material particles are source materials for a lithium composite transition metal oxide;
   sintering the ground product particles to synthesize the lithium composite transition metal oxide; and
   disaggregating and classifying the synthesized lithium composite transition metal oxide to obtain a positive electrode active material powder,
   wherein the mixing and grinding the raw material particles comprises:
   placing the raw material particles and beads in a chamber of a grinding device, where the grinding device includes a rotatable rotor in the chamber; and
   performing a dry process of mixing and grinding the raw material particles in the chamber by rotating the rotor to give kinetic energy to the beads, causing collisions between the beads and the raw material particles, wherein the kinetic energy applied from the beads is 200 to 2000 J per unit weight (1 kg) of the raw material particles.

2. The method for manufacturing a positive electrode active material according to claim 1, wherein the ground product particles are agglomerates of the ground raw material particles, and wherein an average particle diameter (D50) of the ground raw material particles that form the agglomerates is 2 μm or less in size.

3. The method for manufacturing a positive electrode active material according to claim 1, wherein a Maximum Relative Velocity (MRV) of the beads is 9 to 18 m/s.

4. The method for manufacturing a positive electrode active material according to claim 1, where the mixing and grinding raw material particles further comprises:
   providing cooling water into the chamber during the grinding and mixing of the raw material particles to prevent degradation of the raw material particles by heat generation.

5. The method for manufacturing a positive electrode active material according to claim 1, wherein the raw material particles comprise a lithium source, a nickel source, a cobalt source and a manganese source, and a nickel content of the lithium composite transition metal oxide is 85 mol % or more, relative to the total transition metal content in the lithium composite transition metal oxide.

6. The method for manufacturing a positive electrode active material according to claim 1, wherein a temperature of the sintering ranges between 760° C. and 900° C.

7. The method for manufacturing a positive electrode active material according to claim 1, wherein the mixing and grinding the raw material particles comprises:
   rotating the rotor at a first speed during the grinding and mixing; and then rotating the rotor at a second speed that is slower than the first speed or non-rotating the rotor; and then
   rotating the rotor at the first speed again during the grinding and mixing.

8. The method for manufacturing a positive electrode active material according to claim 1, wherein the mixing and grinding is performed in the grinding device after the raw material particles and the beads are filled to 5 to 60% of an internal volume of the chamber.

* * * * *